United States Patent
Ando

(10) Patent No.: US 11,433,919 B2
(45) Date of Patent: Sep. 6, 2022

(54) VEHICLE CONTROL INTERFACE, VEHICLE SYSTEM, AND AUTOMATED-DRIVING PLATFORM

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 16/810,958

(22) Filed: Mar. 6, 2020

(65) Prior Publication Data
US 2020/0331494 A1 Oct. 22, 2020

(30) Foreign Application Priority Data
Apr. 16, 2019 (JP) .............................. JP2019-077957

(51) Int. Cl.
*B60W 60/00* (2020.01)
(52) U.S. Cl.
CPC .... *B60W 60/0015* (2020.02); *B60W 60/0011* (2020.02); *B60W 60/0025* (2020.02)
(58) Field of Classification Search
None
See application file for complete search history.

(56) References Cited

U.S. PATENT DOCUMENTS

| 6,154,688 A | 11/2000 | Dominke et al. |
| 2008/0288150 A1 | 11/2008 | Isogai et al. |
| 2012/0109460 A1 | 5/2012 | Tokimasa et al. |
| 2015/0234382 A1 | 8/2015 | Ju et al. |
| 2015/0375740 A1 | 12/2015 | Okamura et al. |
| 2017/0036677 A1 | 2/2017 | Blumentritt et al. |
| 2017/0158199 A1* | 6/2017 | Pallett ................. B60W 40/107 |
| 2018/0086336 A1 | 3/2018 | Jones et al. |
| 2018/0162412 A1 | 6/2018 | Gao et al. |
| 2018/0211061 A1 | 7/2018 | Scheid |

(Continued)

FOREIGN PATENT DOCUMENTS

| JP | H10-250417 A | 9/1998 |
| JP | 2003-191774 A | 7/2003 |

(Continued)

OTHER PUBLICATIONS

U.S. Appl. No. 16/802,671, filed Feb. 27, 2020 in the name of Ando.

(Continued)

*Primary Examiner* — Tamara L Weber
(74) *Attorney, Agent, or Firm* — Oliff PLC

(57) ABSTRACT

A vehicle control interface includes a control unit configured to: connect between a vehicle platform including a first computer that performs travel control of a vehicle and an automated-driving platform including a second computer that performs automated-driving control of the vehicle and acquire a first control command containing an instruction for the vehicle platform from the second computer; convert the first control command to a second control command for the first computer; and send the second control command to the first computer. The control unit is configured to send, to the second computer, a specifiable range of a physical quantity that is specified by the second computer via the first control command.

7 Claims, 5 Drawing Sheets

(56) References Cited

U.S. PATENT DOCUMENTS

2018/0341266 A1     11/2018  Morimura
2019/0359225 A1*    11/2019  Kanoh ................ G05D 1/0077
2020/0324788 A1     10/2020  Ando
2020/0324789 A1     10/2020  Ando

FOREIGN PATENT DOCUMENTS

| JP | 2008-279983 A | 11/2008 |
| JP | 2018-016107 A | 2/2018 |
| JP | 2018-132015 A | 8/2018 |
| JP | 2018-198485 A | 12/2018 |
| WO | 03/059680 A1 | 7/2003 |

OTHER PUBLICATIONS

Dec. 8, 2021 Office Action issued in U.S. Appl. No. 16/802,671.
U.S. Appl. No. 16/815,134, filed Mar. 11, 2020 in the name of Ando.
Oct. 15, 2021 Office Action issued in U.S. Appl. No. 16/815,134.
Apr. 15, 2022 Office Action issued in U.S. Appl. No. 16/802,671.
Apr. 6, 2022 Office Action issued in U.S. Appl. No. 16/815,134.

\* cited by examiner

US 11,433,919 B2

VEHICLE CONTROL INTERFACE, VEHICLE SYSTEM, AND AUTOMATED-DRIVING PLATFORM

INCORPORATION BY REFERENCE

The disclosure of Japanese Patent Application No. 2019-077957 filed on Apr. 16, 2019 including the specification, drawings and abstract is incorporated herein by reference in its entirety.

BACKGROUND

1. Technical Field

The disclosure relates to control of a vehicle.

2. Description of Related Art

There have been active studies related to automated-driving of vehicles. For example, Japanese Patent Application Publication No. 2018-132015 describes a vehicle system in which an automated-driving ECU having functions for sensing vehicle surroundings is provided in a vehicle separately from an engine ECU and the automated-driving ECU issues instructions to the engine ECU over an in-vehicle network. By providing an ECU for managing power for the vehicle and an ECU for automated-driving independently from each other as in the disclosure described in JP 2018-132015 A, automated-driving functions can be added without making a major modification to an existing vehicle platform. This can also promote development of automated-driving functions by third parties.

SUMMARY

There can be a case where a command from the ECU for automated-driving cannot be effected on a side of the vehicle depending on a status of the vehicle or road conditions. For example, when a command from the ECU for automated-driving is a command to accelerate to a certain speed within a certain amount of time, such acceleration might be impossible depending on the vehicle's performance, the road conditions and the like.

In view of such a challenge, the present disclosure enables more appropriate control of an automated-driving vehicle.

A vehicle control interface according to the present disclosure includes a control unit configured to: connect between a vehicle platform including a first computer that performs travel control of a vehicle and an automated-driving platform including a second computer that performs automated-driving control of the vehicle, and acquire a first control command containing an instruction for the vehicle platform from the second computer; convert the first control command to a second control command for the first computer; and send the second control command to the first computer, wherein the control unit is configured to send, to the second computer, a specifiable range of a physical quantity that is specified by the second computer via the first control command.

A vehicle system according to the present disclosure includes a vehicle platform including a first computer that performs travel control of a vehicle, and a vehicle control interface that connects between the vehicle platform and an automated-driving platform including a second computer that performs automated-driving control of the vehicle, wherein the vehicle control interface includes a control unit configured to: acquire a first control command containing a plurality of instructions for the vehicle platform from the second computer; convert the first control command to a second control command for the first computer; and send the second control command to the first computer, and wherein the control unit is configured to send, to the second computer, a specifiable range of a physical quantity that is specified by the second computer via the first control command.

An automated-driving platform according to the present disclosure includes a control unit configured to: receive, from a vehicle control interface, a specifiable range of a physical quantity to be specified via a first control command, and generate the first control command such that the physical quantity to be specified via the first control command falls within the received specifiable range, wherein the vehicle control interface is configured to: connect between a vehicle platform including a first computer that performs travel control of a vehicle and an automated-driving platform including a second computer that performs automated-driving control of the vehicle, and acquire the first control command containing an instruction for the vehicle platform from the second computer; convert the first control command to a second control command for the first computer; and send the second control command to the first computer.

Another aspect of the present disclosure is an information processing method for execution by the vehicle control interface, a program for causing a computer to execute the information processing method, or a computer-readable storage medium non-transitorily storing the program.

The present disclosure enables more appropriate control of an automated-driving vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An arrangement is conceivable in which a vehicle platform including a computer responsible for handling the power of the vehicle and an automated-driving platform that makes determinations related to automated-driving are incorporated into a vehicle system as independent components. For example, the automated-driving platform performs sensing of the vehicle surroundings and sends a control command to an existing vehicle platform based on a result of the sensing. Such an arrangement allows independent vendors to develop the platforms, thus promoting development of automated-driving functions by third parties.

However, several issues are encountered when platforms developed by different vendors are included in the same vehicle system together, that is, when a power system for the vehicle and an automated-driving system which issues control commands to the power system are connected to the same in-vehicle network. One of such issues is that there is no standardization in notation of instructions for controlling the vehicle platform among manufacturers or models. For example, as forms of input/output of engine ECUs vary among manufacturers or models, it is costly to make an automated-driving ECU compatible with every model. In addition, as various kinds of information for controlling the vehicle flow in an in-vehicle network, it is not desirable to permit an automated-driving platform (manufactured by a third party not directly relevant to the vehicle platform) to make unlimited access to such information.

Figure 1:
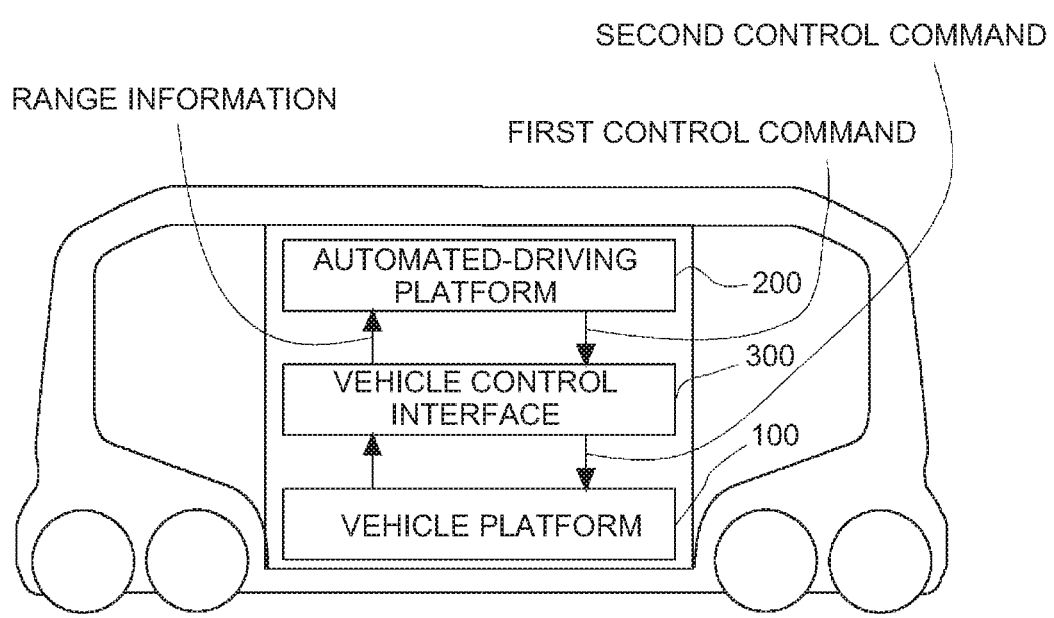
FIG. 1 schematically shows a vehicle system according to a first embodiment.

Thus, a vehicle system according to an embodiment of the present disclosure connects between the vehicle platform and the automated-driving platform via a vehicle control interface, which relays information. FIG. 1 schematically shows the vehicle system according to this embodiment. A vehicle platform 100 is a platform including a first computer (e.g., an engine ECU) that performs travel control of the vehicle. An automated-driving platform 200 is a platform including a second computer (e.g., an automated-driving ECU) that performs automated-driving control of the vehicle. The automated-driving platform 200 may include means for sensing the vehicle surroundings or means for generating a travel-related plan based on sensing results.

A vehicle control interface 300 is a device that connects between the vehicle platform 100 and the automated-driving platform 200 and relays information input and output by them to each other. More specifically, the vehicle control interface 300 is configured to have a control unit that acquires a first control command containing multiple instructions for the vehicle platform from the second computer, converts the acquired first control command to a second control command for the first computer, and sends the second control command to the first computer.

The first control command is generated as a generic command not specific to the vehicle platform as destination. The first control command contains multiple instructions for the vehicle platform. The multiple instructions include, but not limited to, instructions for an engine system, instructions for a power train system, instructions for a brake system, instructions for an electrical system, and instructions for a body-related system, for example. The instructions do not have to be per vehicle component. For example, they may be an instruction indicating acceleration/deceleration, an instruction indicating steering, etc. The instructions may also be a command indicating a temperature of an air conditioner, a command indicating locking/unlocking of a door or a trunk, a command indicating opening/closing of a door or the trunk, a command indicating opening/closing of a window, a command indicating activation and deactivation (ON/OFF) of wipers, a light or a warning light, and a command indicating a direction to be indicated by a direction indicator, for example.

The control unit converts the first control command to the second control command intended for the first computer. Such a configuration enables conversion of a generic command to a command specific to a model or a manufacturer. It can be sometimes difficult, however, for the vehicle platform to follow the instruction contained in the second control command when a generated second control command is sent to the first computer. For example, when the second control command contains an instruction related to acceleration or deceleration of the vehicle, it may be difficult to control the vehicle with the commanded acceleration or deceleration depending on the performance of the vehicle or the road conditions. As another example, when the second control command contains an instruction on steering and if a commanded turning angle of tires is too large for a speed of the vehicle, the vehicle can sideslip. As another example, when the second control command contains an instruction on the temperature of the air conditioner and if a commanded amount of change in the temperature is too large for the performance of the air conditioner, it would be difficult to meet the commanded temperature. It is also possible that what can be commanded from the second computer differs depending on a mode of automated-driving, for example.

The control unit accordingly sends, to the second computer, a specifiable range of a physical quantity to be specified via the first control command. Information that is sent includes information on travel control of the vehicle, information on automated-driving control, information on body control of the vehicle and so on. Information on the travel control of the vehicle includes information on specifiable maximum acceleration and deceleration, a specifiable amount of change in the turning angle of the tires, a maximum lateral acceleration, and a maximum lateral jerk, for example. Information on automated-driving control includes information on modes of automated-driving, level of automated-driving and the like, for example. The modes of automated-driving include a manual mode, an automated-driving mode with an operator, and an automated-driving mode without an operator, for example. For example, automated-driving becomes unavailable when an occupant fails authentication or during driving in the manual mode. In such a case, the vehicle control interface 300 notifies the second computer that the range of automated-driving modes that can be specified by the second computer is the manual mode only.

The levels of automated-driving include manual driving by an occupant, automated-driving with an operator, and automated-driving without an operator, for example. The specifiable ranges of physical quantities to be specified via the first control command can differ when there is an operator and when there is not. Thus, the vehicle control interface 300 notifies the second computer of the specifiable ranges according to the level of automated-driving.

Information on the body control of the vehicle includes information on the control of the air conditioner, doors, trunk, windows, wipers, lights, direction indicators, warning lights and so on. The second computer may also be notified of information on a specifiable range which is based on a warning indicated on a speedometer and the like or a warning from the first computer.

Sending of such information to the second computer allows the second computer to generate the first control command such that a physical quantity to be contained in the first control command falls within a range that can be specified on the vehicle platform 100. Thus, it is possible to control the vehicle platform as instructed by the second computer.

The control unit may acquire first information from the first computer and generate the specifiable range based on the first information. The first information is information related to the specifiable range of a physical quantity that is specified by the second computer via the first control command. The first information can include multiple pieces of sensor data sensed in the vehicle platform. The first information can also include information showing the status of the vehicle or the road conditions. The first information can also include information transmitted from a server or the like. By acquiring the first information from the vehicle platform, the control unit can ascertain the status of the vehicle or the road conditions more accurately. It thus enables more accurate notification of the specifiable range of a physical quantity.

The vehicle control interface may further include a first storage unit that stores range generation information as a rule for generating the specifiable range from the first information, and the control unit may generate the specifiable range from the first information based on the range generation information. The first storage unit prestores rules for converting the first information to the specifiable range of a physical quantity, and generates information to be sent to the automated-driving platform based on data sent from the vehicle platform. Such a configuration makes it possible to notify the automated-driving platform of the specifiable ranges of physical quantities regardless of the manufacturer or model.

The first control command may be data not specific to the first computer included in the vehicle and the second control command may be data specific to the first computer.

The vehicle control interface may further include a second storage unit that stores conversion information as a rule for converting the first control command and the second control command, and the control unit may convert the first control command to the second control command based on the conversion information. For example, the second storage unit prestores rules for converting the first control command to the second control command (rules specific to the vehicle), and generates a control command to be sent to the vehicle platform based on data sent from the automated-driving platform. Such a configuration permits introduction of an automated-driving platform regardless of the manufacturer or model.

First Embodiment

A vehicle system according to a first embodiment is generally described. As shown in FIG. 1, the vehicle system according to the first embodiment is configured to have the vehicle platform 100, the automated-driving platform 200, and the vehicle control interface 300. The vehicle platform 100 is a conventional vehicle platform. The vehicle platform 100 operates based on control commands specific to a vehicle and generates vehicle information specific to the vehicle. Control commands and vehicle information are encapsulated in CAN frames flowing in an in-vehicle network, for example.

The automated-driving platform 200 has means for sensing the vehicle surroundings, and issues control commands not specific to a model or a manufacturer. The automated-driving platform 200 also acquires vehicle information not specific to a model or a manufacturer. The vehicle control interface 300 converts between a control command specific to the vehicle (i.e., a control command interpretable by the vehicle platform 100) and a control command not specific to the vehicle (i.e., a control command generated by the automated-driving platform 200). The vehicle control interface 300 also converts between vehicle information specific to the vehicle (i.e., vehicle information generated by the vehicle platform 100) and vehicle information not specific to the vehicle (i.e., vehicle information interpretable by the automated-driving platform 200). The vehicle control interface 300 also sends to the automated-driving platform 200 the specifiable ranges of physical quantities to be specified via control commands.

Figure 2:
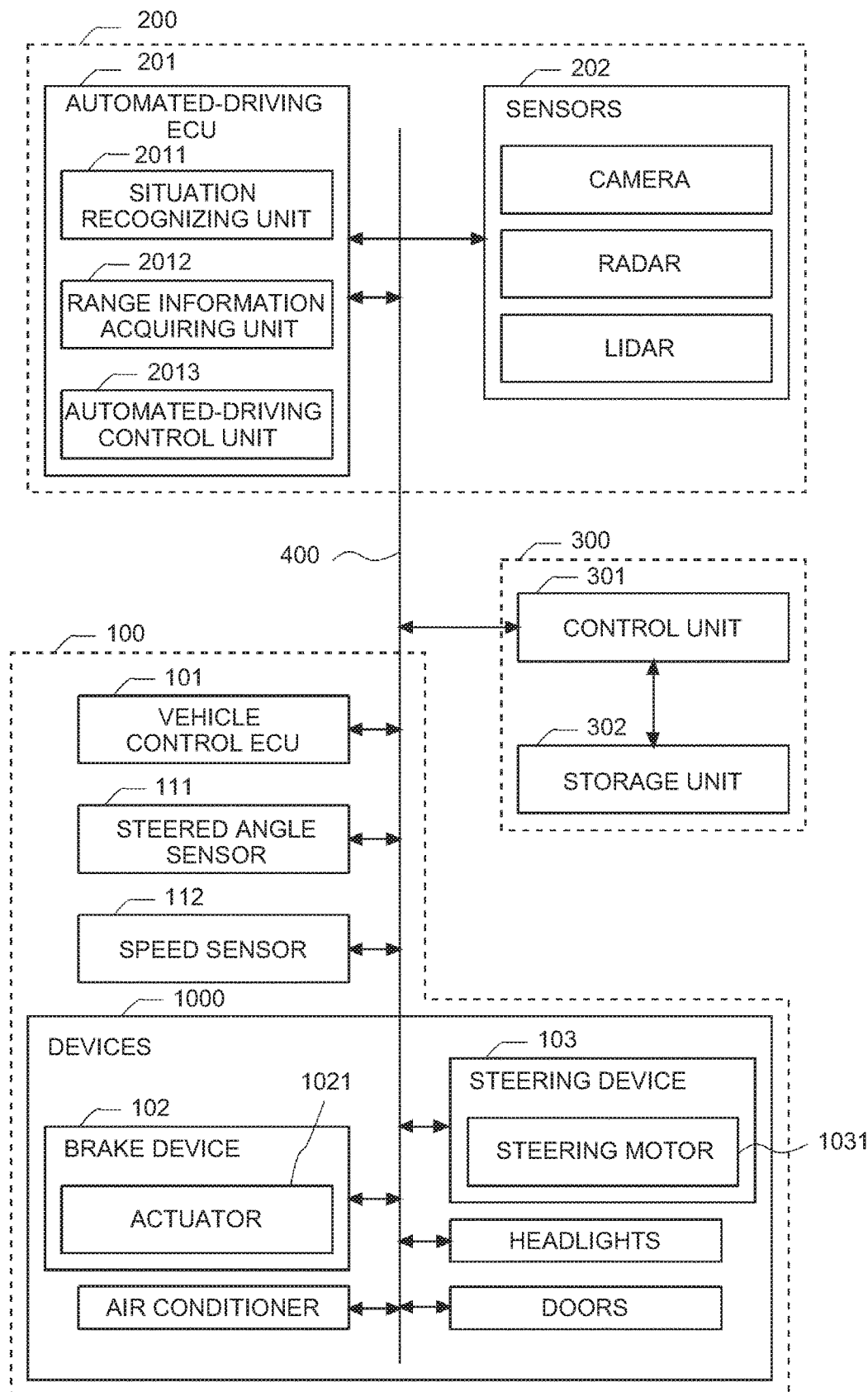
FIG. 2 is a block diagram schematically showing an example of components of the system.

Next, components of the system are described in detail. FIG. 2 is a block diagram schematically showing an exemplary configuration of the vehicle system shown in FIG. 1. The vehicle system includes the vehicle platform 100, the automated-driving platform 200, and the vehicle control interface 300, their components being communicatively connected by a bus 400.

The vehicle platform 100 is configured to have a vehicle control ECU 101, devices 1000 including a brake device 102 and a steering device 103, a steered angle sensor 111, and a speed sensor 112. Although this example shows a vehicle with an engine for illustration, a target vehicle may be an electric vehicle instead. In such a case, the engine ECU could be replaced with an ECU for managing the power of the vehicle. The vehicle platform 100 may be equipped with ECUs and/or sensors other than those shown.

The vehicle control ECU 101 is a computer that controls the components of the vehicle (e.g., engine system components, power train system components, brake system components, electrical system components, and body-related system components). The vehicle control ECU 101 may also be a set of multiple computers. The vehicle control ECU 101 controls a speed of the engine by fuel injection control, for example. The vehicle control ECU 101 can control the speed of the engine based on a control command generated by an occupant's operation (such as operation of an accelerator pedal) (e.g., a command specifying a throttle opening degree), for example.

In a case where the vehicle is an electric vehicle, the vehicle control ECU 101 can control a speed of a motor by controlling driving voltage and current, driving frequency and the like. In such a case, the speed of the motor can also be controlled based on a control command generated by an occupant's operation, as with an internal combustion vehicle. Regenerative current can also be controlled based on a control command indicating pressing force on a brake pedal or a degree of a regenerative brake. In a case where the vehicle is a hybrid vehicle, control on the engine and control on the motor may be both performed.

In addition, the vehicle control ECU 101 can control braking force generated by a mechanical brake by controlling an actuator 1021 included in the brake device 102, discussed later. The vehicle control ECU 101 controls brake hydraulic pressure by driving the actuator 1021 based on a control command generated by an occupant's operation (such as operation of the brake pedal) (e.g., a command representing pressing force on the brake pedal), for example.

The vehicle control ECU 101 can also control the steering angle or an angle of driving wheels (steered angle) by driving a steering motor 1031 included in the steering device 103, discussed later. The vehicle control ECU 101 controls the steered angle of the vehicle by driving the steering motor 1031 based on a control command generated by an occupant's operation (such as a steering operation) (e.g., a command representing a steering angle), for example.

The control command may be generated either inside the vehicle platform 100 based on an occupant's operation or outside the vehicle platform 100 (e.g., by the automated-driving platform 200).

The devices 1000 are multiple devices included in the vehicle and controlled by the vehicle control ECU 101. The devices 1000 are typically configured to include the brake device 102, the steering device 103, an air conditioner, headlights, doors and so on. The devices 1000 may also include locking/unlocking devices for the doors or the trunk, wipers, a cabin light, direction indicators, hazard lights, a parking brake, a shift device and the like.

The brake device 102 is a mechanical brake system of the vehicle. The brake device 102 is configured to include an interface (such as a brake pedal), the actuator 1021, a hydraulic system, a brake cylinder and the like. The actuator 1021 is means for controlling the hydraulic pressure in the brake system. By the actuator 1021 controlling the brake hydraulic pressure in response to a command from the vehicle control ECU 101, braking force generated by the mechanical brake can be secured.

The steering device 103 is a steering system of the vehicle. The steering device 103 is configured to include an interface (such as a steering wheel), the steering motor 1031, a gearbox, a steering column and the like. The steering motor 1031 is means for assisting in steering operations. Driving of the steering motor 1031 in response to a command from the vehicle control ECU 101 can reduce force required for a steering operation. Driving of the steering motor 1031 also enables automation of steering operations not relying on an occupant's operation.

The steered angle sensor 111 is a sensor to detect a steered angle resulting from a steering operation. A detected value acquired by the steered angle sensor 111 is sent to the vehicle control ECU 101 whenever it is acquired. Although this embodiment uses a numerical value directly representing a turning angle of the tires as the steered angle, a value indirectly representing a turning angle of the tires may be used instead. The speed sensor 112 is a sensor to detect the speed of the vehicle. A detected value obtained by the speed sensor 112 is sent to the vehicle control ECU 101 whenever it is obtained.

Next, the vehicle control interface 300 is described. Control commands handled by the vehicle control ECU 101 in this embodiment are in a format specific to a vehicle and a manufacturer. In contrast, the automated-driving platform 200 is a device developed by a third party and intended for incorporation into various models from various manufacturers. This means that it is costly to connect the two to the same in-vehicle network. Accordingly, this embodiment utilizes the vehicle control interface 300 as a device that converts and relays data exchanged between the vehicle control ECU 101 and an automated-driving ECU 201 of the automated-driving platform 200 described later.

Figure 3:
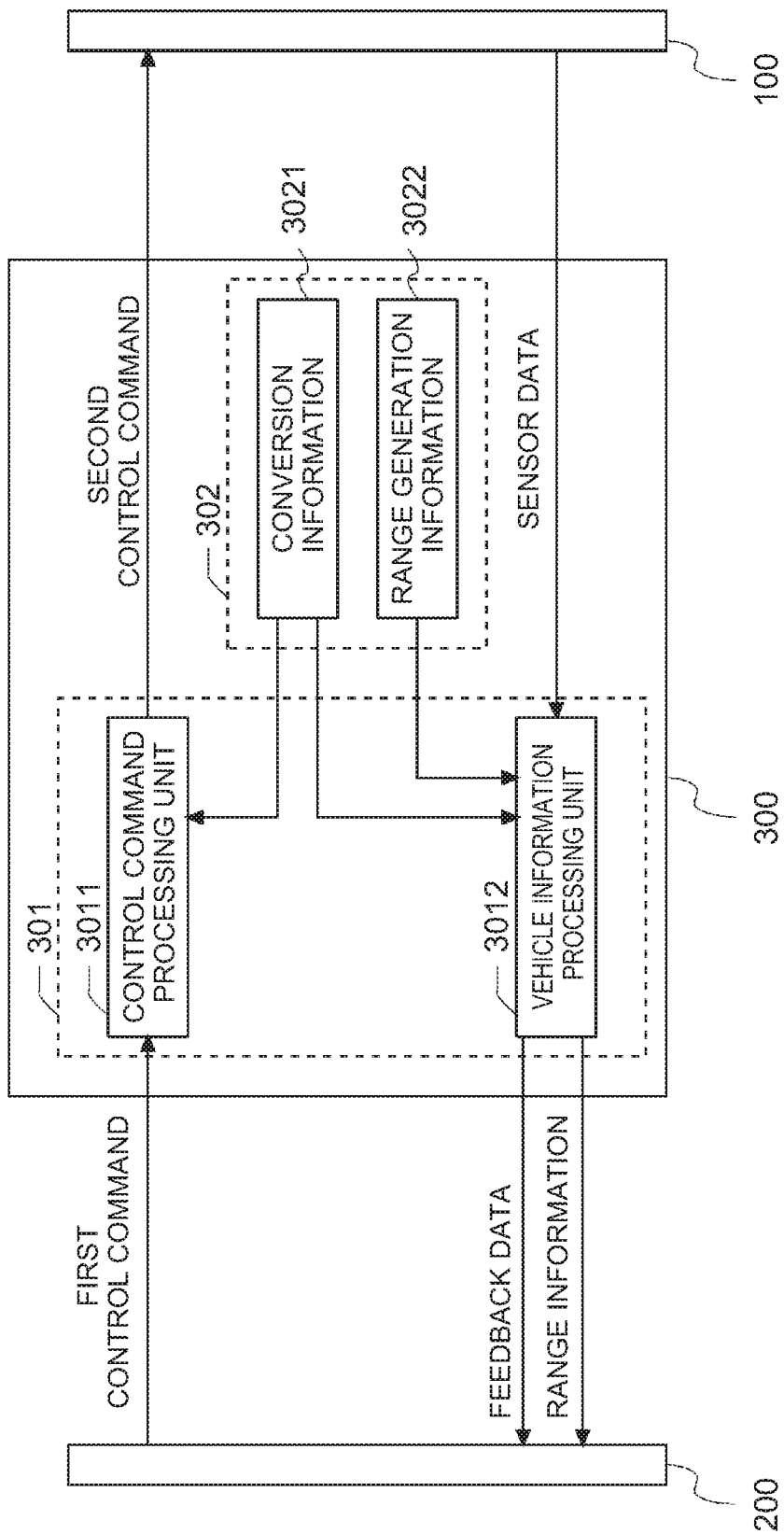
FIG. 3 illustrates a vehicle control interface.

A control unit 301 is a computer that converts between control commands handled by the vehicle control ECU 101 and control commands handled by the automated-driving ECU 201. The control unit 301 is composed of a CPU (Central Processing Unit), for example. The control unit 301 is configured to have two functional modules: a control command processing unit 3011 and a vehicle information processing unit 3012, as shown in FIG. 3. The functional modules may be embodied by execution of programs stored in a storage unit 302, discussed later, by the CPU.

The control command processing unit 3011 receives the first control command from the automated-driving ECU 201 and converts the control command to data interpretable by the vehicle control ECU 101 (the second control command). For example, when the first control command contains data that specifies an acceleration/deceleration, the control command processing unit 3011 converts the specified acceleration/deceleration (e.g., +3.0 km/h/s) to data that indicates a throttle opening degree or data that indicates a brake pressure. The second control command resulting from the conversion is sent in a protocol or format specific to the vehicle platform 100. When the first control command contains data that specifies a steered angle, the control command processing unit 3011 converts the specified steered angle (e.g., 10 degrees to the right) to data that indicates a steered angle and is interpretable by the vehicle control ECU 101. Conversion processing is performed using conversion information stored in the storage unit 302, discussed later. This will be described later.

The vehicle information processing unit 3012 receives information on the status of the vehicle and the like from the vehicle control ECU 101 and converts the information to information interpretable by the automated-driving ECU 201 (information not specific to the model). More specifically, it converts information sent in a protocol or a format specific to the vehicle platform 100 to information in a common format (hereinbelow, feedback data). Hereinafter, information on the status of the vehicle and the like will be referred to as sensor data. Sensor data is based on information acquired by the steered angle sensor 111 and the speed sensor 112, for example, and is sent to the in-vehicle network by the vehicle control ECU 101. Sensor data is data in a format specific to the vehicle platform. Sensor data can be any kind of data that can be fed back to the automated-driving ECU 201, such as car speed information, information on the turning angle of the tires, and information on the steering angle, for example. Sensor data can also include information indicating whether certain equipment included in the vehicle platform 100 is in operation or not. Sensor data can also include information received from external devices (e.g., information on weather, information on road conditions, and information on a current location of the vehicle).

In this embodiment, the vehicle information processing unit 3012 generates the following pieces of data as feedback data, for example, and sends it to the automated-driving platform 200:

(1) Brake system status
(2) Power train system status
(3) Direction control status The brake system status is data on the brake system of the vehicle, including the deceleration of the vehicle, a locking status of the wheels, and an operational status of an ABS, for example. The power train system status is data on the power train system of the vehicle, including the car speed, the acceleration of the vehicle, slip state of the wheels, status of traction control, for example. The direction control status is data on a direction control system of the vehicle, including data on the turning angles of the tires, the steering angle, a direction of travel of the vehicle, and lateral G acting on the vehicle, for example. Feedback data including these pieces of data is common data that is not dependent on a model or a manufacturer.

There can be a case where the second control command cannot be effected on the vehicle platform 100 when the control command processing unit 3011 sends the second control command to the vehicle platform 100 depending on the status of the vehicle or road conditions. To address such a case, the vehicle control interface 300 in this embodiment notifies the automated-driving platform 200 of the specifiable ranges of the acceleration/deceleration and steered angle.

The vehicle information processing unit 3012 of the vehicle control interface 300 generates information on the specifiable ranges of physical quantities to be contained in the first control command (hereinafter, range information) based on sensor data acquired from the side of the vehicle platform 100 and provides the information to the automated-driving ECU 201 of the automated-driving platform 200. Providing range information to the automated-driving ECU 201 allows the automated-driving ECU 201 to perform appropriate control. Range information is common data that is not dependent on the model or the manufacturer.

Range information that can be provided for notification include, but not limited to, the following pieces of information, for example. It may be any range that corresponds to a physical quantity contained in the first control command sent from the automated-driving platform 200.

(1) Information on the ranges of specifiable acceleration/deceleration (lower and upper limits)

(2) Information on the range of specifiable steered angles (a left angle and a right angle)

(3) Information on the range of specifiable amount of change in the steered angle (angular velocity)

(4) Information on the range of specifiable lateral accelerations or specifiable lateral jerks (the upper limit)

(5) Information on specifiable automated-driving modes (6) Information on specifiable automated-driving levels (manual, automated-driving with an operator, automated-driving without an operator)

(7) Information on the range of specifiable temperatures of the air conditioner (the lower and upper limits)

(8) Information on specifiable statuses of the doors or the trunk (open/closed or locked/unlocked)

(9) Information on specifiable window statuses (open/closed status)

(10) Information on the specifiable statuses of the wipers (ON/OFF)

(11) Information on the specifiable statuses of the headlights or the cabin light (ON/OFF)

(12) Information on the specifiable statuses of the direction indicators (right-direction flashing or left-direction flashing)

(13) Information on the specifiable statuses of the hazard lights (ON/OFF)

(14) Information on the statuses of warning lights indicated on the speedometer (ON/OFF)

(15) Information on a specifiable shift range

(16) Information on the specifiable statuses of the parking brake (ON/OFF)

Achievable acceleration/deceleration of the vehicle can vary depending on the number of occupants, loading quantity, a load status of the engine or the motor, the performance of the engine or the motor, road surface conditions, weather and the like. Thus, the vehicle information processing unit 3012 calculates the ranges of specifiable acceleration/deceleration based on the number of occupants, the loading quantity, the load status of the engine or the motor, the performance of the engine or the motor, road surface conditions, weather and the like. The number of occupants may be detected by a sensor or be calculated through analysis of an image showing an interior of the vehicle captured by a camera, for example. The loading quantity may be detected by a sensor or be calculated based on data previously entered by a user, for example. The load status of the engine or the motor can be calculated based on an amount of fuel injection in the engine or electric power in the motor, for example. The performance of the engine or the motor can be prestored in the storage unit 302. The road surface condition and the weather may be detected by sensors included in the vehicle or be acquired from external servers, for example. The acquisition of data from external servers may be done via either the vehicle platform 100 or the automated-driving platform 200. The specifiable ranges of acceleration/deceleration may also be indicated by ranges of other physical quantities relevant to acceleration/deceleration. For example, it may be a specifiable range of the brake hydraulic pressure, a specifiable range of amounts of change in the brake hydraulic pressure per unit time, a specifiable range of an amount of actuation of the actuator 1021, a specifiable range of amounts of actuation of the actuator 1021 per unit time, a specifiable range of the throttle opening degree, a specifiable range of amounts of change in the throttle opening degree, a specifiable range of amounts of change in the throttle opening degree per unit time or the like.

The range of achievable steered angles and the range of achievable amounts of change in the steered angle can vary depending on the car speed, road conditions, traffic condition, weather, etc. For example, since making the steered angle too large during traveling of the vehicle at a high speed can cause a sideslip and the like, the steered angle is limited in accordance with the speed of vehicle. The steered angle can also be limited in accordance with the weather because the vehicle is more likely to sideslip on a rainy day than on a sunny day, for example. Thus, the vehicle information processing unit 3012 calculates the range of specifiable steered angles and the range of specifiable amounts of change in the steered angle based on the car speed, road conditions, traffic conditions, weather, etc. The road conditions and the traffic conditions may be detected by sensors included in the vehicle or be acquired from external servers, as with the weather. The range of specifiable steered angles and the range of specifiable amounts of change in the steered angle may be indicated by ranges of other physical quantities relevant to the steered angle and the amount of change in the steered angle. For example, it may be a specifiable range of amounts of actuation of the steering motor 1031 or a specifiable range of amounts of actuation of the steering motor 1031 per unit time.

The achievable lateral acceleration or lateral jerk of the vehicle can also vary depending on the number of occupants, loading quantity, road surface conditions, weather and the like. Thus, the vehicle information processing unit 3012 calculates the range of specifiable lateral accelerations or specifiable lateral jerks based on the number of occupants, loading quantity, road surface conditions, weather and the like.

The achievable automated-driving modes can vary depending on the status of the vehicle. For example, travel by automated-driving becomes unavailable when an occupant cannot be authenticated in a case where authentication is required for an occupant of the vehicle. Travel by automated-driving also becomes unavailable while the vehicle is running in the manual mode. Also, in a case where traveling of the vehicle is prohibited when an occupant does not wear a seatbelt, for example, travel by automated-driving and manual driving are limited when an occupant does not wear a seatbelt. Whether an occupant wears a seatbelt or not can be detected by a seat sensor for detecting sitting of an occupant on a seat and a seatbelt sensor for detecting wearing of the seatbelt by the occupant. The vehicle information processing unit 3012 calculates the range of specifiable automated-driving modes based on the result of occupant authentication, whether the vehicle is in the manual mode or not, detected values from sensors and the like.

The achievable automated-driving levels can vary depending on the status of the vehicle. The automated-driving levels include manual driving by an occupant, automated-driving with an operator, and automated-driving without an operator, for example. For example, the range that can be controlled by the automated-driving platform 200 can differ when there is an operator and when there is not. Thus, the vehicle information processing unit 3012 calculates the range of specifiable automated-driving levels based on whether an operator is present or not and the like. Whether an operator is present or not can be determined based on a detected value from the seat sensor.

Achievable temperatures of the air conditioner can vary depending on the performance of the air conditioner, outside temperature, and so on. Thus, the vehicle information processing unit 3012 calculates the range of specifiable temperatures of the air conditioner based on the performance of the air conditioner, outside temperature, and so on. The outside temperature can be detected by a sensor, for example.

The achievable statuses of the doors or the trunk can vary depending on the result of occupant authentication, the travel status of the vehicle, and the like. For example, opening or unlocking of the doors and the trunk is limited during traveling. Unlocking or opening of the doors and the trunk is also limited when a user fails an authentication, for example. Thus, the vehicle information processing unit 3012 calculates the range of specifiable statuses of the doors or the trunk based on an authentication result or the travel status of the vehicle.

Achievable window statuses can vary depending on the travel status of the vehicle and the like. For example, opening of the windows is limited when the speed of the vehicle is higher than a predetermined speed. Opening of the windows is also limited when it is raining. Whether it is raining or not may be detected by a sensor or information may be acquired from an external server. The vehicle information processing unit 3012 calculates the range of specifiable window statuses based on the travel status of the vehicle, the weather and the like.

The wipers are actuated in accordance with the weather or how dirty a window is. For example, actuation of the wipers is limited except when raindrops or soil are adherent on a front windshield. Whether raindrops or soil are adherent on the front windshield can be detected by a sensor, for example. Whether raindrops are adherent on the front windshield or not may also be determined based on information on the weather acquired from an external server. The vehicle information processing unit 3012 calculates the range of specifiable wiper statuses based on the weather or how dirty the window is.

The headlights are actuated in accordance with brightness around the vehicle, for example. The brightness around the vehicle can be detected by a sensor, for example. Instead, the brightness around the vehicle may be inferred from a time of day, the current location of the vehicle or the like. For example, if the current location of the vehicle is within a tunnel, turning off of the headlights is limited. The vehicle information processing unit 3012 calculates the specifiable statuses of the headlights based on the brightness around the vehicle. The cabin light is actuated in accordance with the brightness around the vehicle or the travel status of the vehicle. For example, the cabin light is turned on while the vehicle is stopped or a door is opened, and turning on of the cabin light is limited otherwise. The vehicle information processing unit 3012 calculates the specifiable statuses of the cabin light based on the brightness around the vehicle or the travel status of the vehicle. The specifiable ranges of the brightness of the headlights and cabin light may be varied according to the brightness around the vehicle and the like.

The direction indicators are actuated in accordance with a course change of the vehicle or a right or left turn, for example. For example, when a right turn is intended, flashing of the direction indicator located on a left side of the vehicle is limited. A course change of the vehicle and a right or left turn are obtained based on a driving plan of the vehicle, for example. The actuation of the direction indicators may be limited based on the steered angle. The vehicle information processing unit 3012 calculates the range of specifiable direction indicator statuses based on vehicle operations such as a course change of the vehicle and a right or left turn, the driving plan of the vehicle, and so on.

The hazard lights are actuated when there is an emergency on the vehicle, for example. Thus, the vehicle information processing unit 3012 calculates the range of specifiable statues of the hazard lights based on the status of the vehicle.

The achievable travel statuses of the vehicle can vary depending on the status of a warning light indicated in the speedometer, for example. For example, traveling of the vehicle is limited when a warning light in the speedometer lights up. Also, when a warning light in the speedometer lights up, the vehicle is only permitted to stop and travel at low speed. The vehicle information processing unit 3012 calculates the range of specifiable travel statuses of the vehicle based on the statuses of warning lights. It may also calculate the range of specifiable travel statuses of the vehicle based on a warning output by the vehicle platform 100 in addition to a warning in the speedometer.

The achievable shift range can vary depending on the status of the vehicle, for example. The shift range includes parking, reverse, neutral, and drive, for example. For example, a shift change to the parking, the reverse, and the neutral is limited while the vehicle is running. In a case where traveling of the vehicle is prohibited when an occupant does not wear a seatbelt, for example, shift change to the drive is limited when an occupant does not wear the seatbelt. The vehicle information processing unit 3012 calculates the range of specifiable shift ranges based on the status of the vehicle and the like.

The parking brake is actuated only while the vehicle is stopped, for example. For example, in a case where traveling of the vehicle is prohibited when an occupant does not wear a seatbelt, releasing of the parking brake is limited when an occupant does not wear the seatbelt. Thus, the vehicle information processing unit 3012 calculates the range of specifiable parking brake statuses based on the car speed, detected values from sensors and the like.

Rules for generating these pieces of range information are prestored in the storage unit 302, discussed later, as range generation information 3022. The vehicle information processing unit 3012 calculates range information based on the range generation information 3022 and notifies the automated-driving ECU 201 of the range information, thus enabling the automated-driving ECU 201 to perform appropriate control. The vehicle information processing unit 3012 may add other information to the range information. For example, it may add estimated values of acceleration/deceleration at a full closing of the throttle to the range information.

The storage unit 302 is means for storing information, composed of a storage medium such as RAM, magnetic disk, or flash memory. The storage unit 302 stores information for converting between the first control command generated by the automated-driving ECU 201 (the automated-driving control unit 2013) and the second control command interpretable by the vehicle control ECU 101 (hereinafter, conversion information 3021). The conversion information 3021 further includes information for converting sensor data specific to the vehicle into feedback data. The storage unit 302 also stores information for generating range information based on sensor data specific to the vehicle and the like (the range generation information 3022). The storage unit 302 as storing the conversion information 3021 is an example of the second storage unit and the storage unit 302 as storing the range generation information 3022 is an example of the first storage unit.

The conversion information 3021 is formed from a structure of data input to and output from the vehicle control ECU 101, their parameters, tables and expressions for conversion of an input value to a parameter and the like, for example. It is also formed from the structure of data output from the vehicle control ECU 101, their parameters, tables and expressions for conversion of a parameter to a physical value and the like.

The range generation information 3022 is formed from the structure of sensor data output from the vehicle control ECU 101, their parameters, tables and expressions for conversion of a parameter to a range of physical values that can be specified by the automated-driving platform 200 and the like.

Next, the automated-driving platform 200 is described. The automated-driving platform 200 is a device that performs sensing of the vehicle surroundings, generates a plan related to travel based on the result of sensing, and issues a command to the vehicle platform 100 according to the plan. The automated-driving platform 200 may be developed by a manufacturer or vendor different from that of the vehicle platform 100. The automated-driving platform 200 is configured to have the automated-driving ECU 201 and sensors 202 as shown in FIG. 2.

The automated-driving ECU 201 is a computer that makes determination related to automated-driving based on data acquired from the sensors 202, discussed later, and controls the vehicle through communication with the vehicle platform 100. The automated-driving ECU 201 is composed of a CPU (Central Processing Unit), for example. The automated-driving ECU 201 is configured to have three functional modules: a situation recognizing unit 2011, a range information acquiring unit 2012, and an automated-driving control unit 2013. The functional modules may be embodied by execution of programs stored in storage means, such as ROM (Read Only Memory), by the CPU.

The situation recognizing unit 2011 detects an environment around the vehicle based on data acquired by sensors included in the sensors 202, discussed later. Objects to be detected include, but not limited to, the number and positions of lanes, the number and positions of vehicles present around the vehicle, the number and positions of obstacles present around the vehicle (e.g., pedestrians, bicycles, structures, buildings), road structure, and road signs, for example. Objects to be detected may be anything that is necessary for autonomous travel. Data on the environment detected by the situation recognizing unit 2011 (hereinafter, environment data) is sent to the automated-driving control unit 2013, discussed later.

The range information acquiring unit 2012 acquires information on the specifiable range of a physical quantity to be contained in the first control command (range information) from the vehicle control interface 300. The range information acquired by the range information acquiring unit 2012 is sent to the automated-driving control unit 2013, discussed later.

The automated-driving control unit 2013 generates the first control command using the environment data generated by the situation recognizing unit 2011 and the range information acquired by the range information acquiring unit 2012. The automated-driving control unit 2013 generates the following pieces of data, for example, as the first control command and sends them to the vehicle platform 100 via the vehicle control interface 300, thereby controlling the vehicle.

(1) Data specifying an acceleration/deceleration
(2) Data specifying a steered angle
(3) Data specifying an amount of change in the steered angle
(4) Data specifying a lateral acceleration or a lateral jerk
(5) Data specifying an automated-driving mode
(6) Data specifying an automated-driving level
(7) Data specifying the temperature of the air conditioner
(8) Data specifying opening/closing or locking/unlocking of the doors or the trunk
(9) Data specifying opening/closing of a window
(10) Data specifying ON/OFF of the wipers
(11) Data specifying ON/OFF or brightness of the headlights or the cabin light
(12) Data specifying turning on of a direction indicator
(13) Data specifying ON/OFF of the hazard lights
(14) Data specifying a shift range
(15) Data specifying ON/OFF of the parking brake Data specifying an acceleration/deceleration is data that specifies an amount of change (positive or negative) in the speed of the vehicle per unit time. The automated-driving control unit 2013 generates a travel path for the vehicle based on the environment data, for example, and determines an acceleration/deceleration of the vehicle such that the vehicle travels along the travel path. In doing so, the automated-driving control unit 2013 determines the acceleration/deceleration such that the acceleration/deceleration does not exceed its specifiable range. For example, if a provisionally determined acceleration exceeds the specifiable range, the upper limit of the specifiable range is set as the acceleration. For autonomous traveling of the vehicle, a known method may be employed.

Data specifying a steered angle is data that specifies the turning angle of the driving wheels of the vehicle. This data is typically the turning angle of tires as the driving wheels; however, it may be any other data that is related to steering of the vehicle. For example, the data may represent an angle of the steering wheel or a percentage relative to a maximum turning angle. It may also be a planned path for the vehicle per se. Data specifying an amount of change in the steered angle is data that specifies an amount of change in the turning angle of the driving wheels of the vehicle per unit time. The automated-driving control unit 2013 generates a travel path for the vehicle based on environment data, for example, and determines the steered angle or the amount of change in the steered angle such that the vehicle travels along the travel path. In doing so, the automated-driving control unit 2013 determines the steered angle or the amount of change in the steered angle such that the steered angle or the amount of change in the steered angle does not exceed its specifiable range. For example, if a provisionally determined steered angle or amount of change in the steered angle exceeds the specifiable range, the upper limit of the specifiable range is set as the steered angle or amount of change in the steered angle.

Data specifying a lateral acceleration is data that specifies an amount of change in a lateral speed of the vehicle per unit time, and data specifying a lateral jerk is data that specifies an amount of change in the lateral acceleration of the vehicle per unit time. When the lateral acceleration or lateral jerk exceeds its specifiable range, the lateral acceleration or lateral jerk is determined such that it will be at the upper limit of the specifiable range.

Data specifying an automated-driving mode is data that specifies whether to select a mode that allows travel by automated-driving (Ready-On) or a mode that does not allow travel (Sleep), for example. The automated-driving control unit 2013 determines an automated-driving mode that falls in the specifiable range. Data specifying an automated-driving level is data that specifies whether to select either manual driving, automated-driving with an operator, or automated-driving without an operator, for example. The automated-driving control unit 2013 determines an automated-driving level that falls in the specifiable range.

Data specifying the temperature of the air conditioner is data that specifies the temperature in a vehicle cabin. The air conditioner included in the vehicle platform 100 is controlled with the data specifying the temperature of the air conditioner. If a provisionally determined temperature exceeds the specifiable range, for example, the automated-driving control unit 2013 determines the upper limit of the specifiable range as the specified temperature.

Data specifying opening/closing of the doors or the trunk is data that specifies opening or closing of the doors or the trunk of the vehicle. Data specifying locking/unlocking of the doors or the trunk is data that specifies locking/unlocking of locking/unlocking devices included in the doors or the trunk of the vehicle. The automated-driving control unit 2013 specifies opening/closing or locking/unlocking of the doors or the trunk within the specifiable range.

Data specifying opening/closing of a window is data that specifies opening/closing of a window of the vehicle. The automated-driving control unit 2013 specifies opening/closing of a window within the specifiable range. Data specifying ON/OFF of the wipers is data that specifies switching between actuation and non-actuation of the wipers for removing raindrops or soil adherent on the front windshield of the vehicle. The automated-driving control unit 2013 specifies ON/OFF of the wipers within the specifiable range.

Data specifying ON/OFF of the headlights or the cabin light is data that specifies switching between turning on and off of the headlights of the vehicle or the lights in the cabin of the vehicle. Data specifying the brightness of the headlights or cabin light is data that specifies the brightness of the headlights or cabin light, the number of lights to turn on, a type of light to turn on, and the like. The automated-driving control unit 2013 specifies the ON/OFF of the headlights or the cabin light or the brightness of the headlights or the cabin light within the specifiable range.

Data specifying turning on of a direction indicator is data that specifies switching between flashing for a right turn, flashing for a left turn, and turning off for the direction indicators of the vehicle. The automated-driving control unit 2013 specifies flashing and turning off of the direction indicators within the specifiable range. Data specifying the ON/OFF of the hazard lights is data that specifies switching between flashing and turning off of the hazard lights (which may also be direction indicators) of the vehicle. The automated-driving control unit 2013 specifies the ON/OFF of the hazard lights within the specifiable range.

Data specifying a shift range is data that specifies a shift position (e.g., parking, drive, reverse, or neutral). The automated-driving control unit 2013 specifies a shift range within the specifiable range. Data specifying ON/OFF of the parking brake is data that indicates whether a mechanical or electrical parking brake is to be operated or not. The automated-driving control unit 2013 specifies the ON/OFF of the parking brake within the specifiable range. The first control command containing these pieces of data is a common command that is not dependent on the model or the manufacturer.

The sensors 202 are means for sensing the vehicle surroundings, typically configured to include a monocular camera, a stereo camera, a radar, a LIDAR, a laser scanner or the like. In addition to the means for sensing the vehicle surroundings, the sensors 202 may include means for obtaining the current location of the vehicle (such as a GPS module). Information acquired by sensors included in the sensors 202 is sent to the automated-driving ECU 201 (the situation recognizing unit 2011) whenever it is acquired.

In the vehicle system according to the first embodiment, communication takes place between the vehicle platform 100 and the automated-driving platform 200 via the vehicle control interface 300 by means of the configurations described above.

Figure 4:
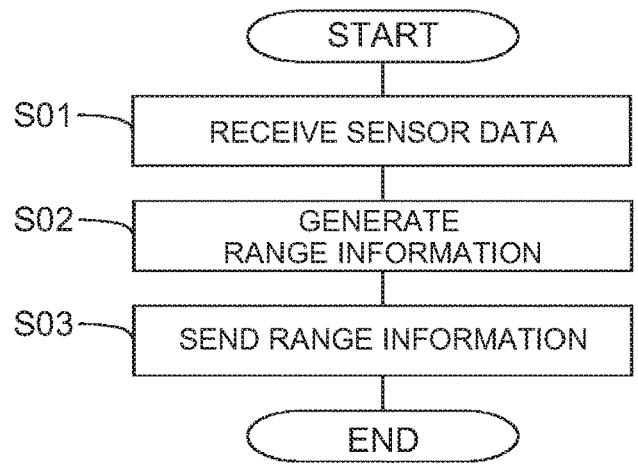
FIG. 4 is a flowchart of processing which is executed by the vehicle control interface in the first embodiment.

Next, processing by which the vehicle control interface 300 according to this embodiment generates range information is described with reference to FIG. 4, which shows a process flowchart. The process shown in FIG. 4 is performed by the vehicle control interface 300 at predetermined intervals.

First, at step S01, the vehicle information processing unit 3012 receives sensor data from the vehicle platform 100. Next, step S02, the vehicle information processing unit 3012 generates range information based on the sensor data and the range generation information 3022. Then, at step S03, the vehicle information processing unit 3012 sends the generated range information to the automated-driving platform 200.

Figure 5:
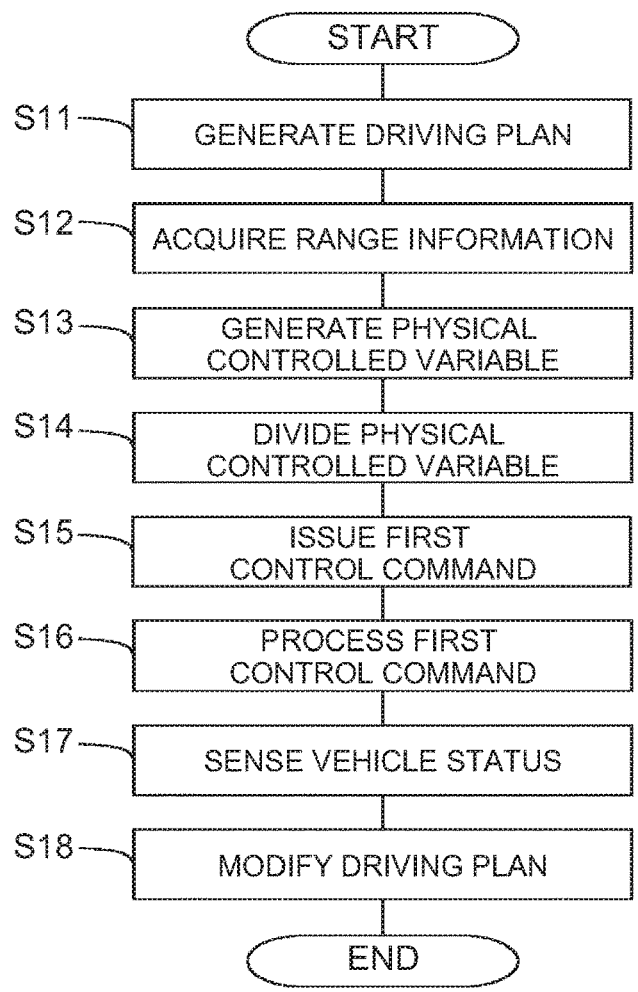
FIG. 5 is a flowchart of processing in the first embodiment.

Next, processing performed by the vehicle system according to this embodiment is described with reference to FIG. 5, which shows a process flowchart. The process shown in FIG. 5 is performed by the vehicle system at the predetermined intervals.

First, at step S11, the automated-driving ECU 201 generates a driving plan based on information acquired from the sensors 202. A driving plan is data that shows a behavior of the vehicle in the predetermined interval. The driving plan may include the travel path for the vehicle or may include information on the acceleration or deceleration of the vehicle. The driving plan may be further generated based on information other than the illustrated one. For example, it may be generated based on a point of origin, a via-point, a destination, map data and so on.

Next, at step S12, the automated-driving ECU 201 acquires range information. The range information may be acquired from the vehicle control interface 300 and stored in a memory or the like beforehand, and this information may be loaded.

Figure 6:
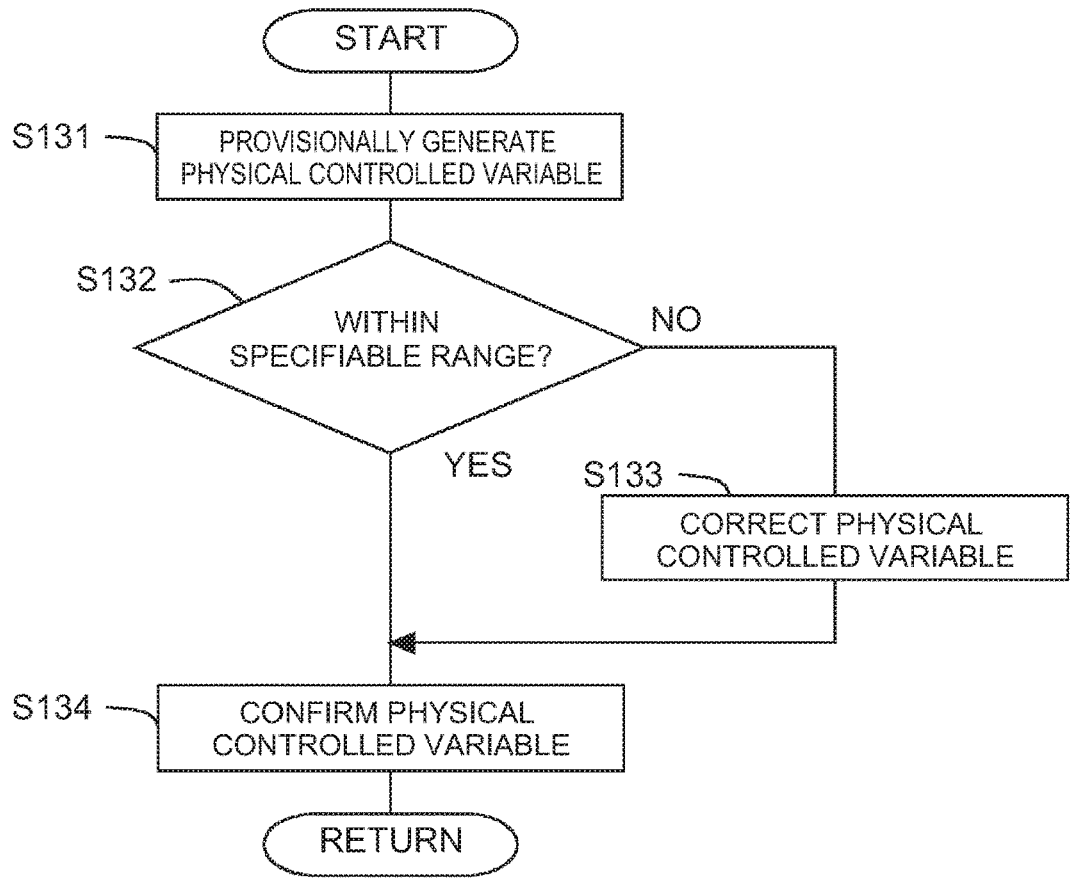
FIG. 6 is a flowchart of processing which is executed by an automated-driving platform in the first embodiment.

Next, at step S13, the automated-driving ECU 201 generates physical controlled variables for achieving the driving plan. FIG. 6 is a diagram showing processing at step S13 in greater detail. This flowchart describes the case of generating two kinds of physical controlled variables: a physical controlled variable for acceleration/deceleration and a physical controlled variable for steered angle. First, at step S131, the automated-driving ECU 201 generates provisional values of the physical controlled variable for acceleration/deceleration and the physical controlled variable for steered angle. The controlled variable for acceleration/deceleration and the controlled variable for steered angle may be generated based on preset parameters, e.g., relationship between the car speed and the maximum steered angle, relationship between a driving environment and the acceleration/deceleration (steered angle), and a time window in which an operation (e.g., a lane change) should be completed.

Next, at step S132, the automated-driving ECU 201 determines whether the generated physical controlled variables are each within its specifiable range or not. The specifiable range is obtained from the range information acquired at step S12. When the determination at step S132 gives an affirmative result, the flow proceeds to step S134, where the physical controlled variables generated at step S131 are confirmed. When the determination at step S132 gives a negative result, the flow proceeds to step S133, where the automated-driving ECU 201 corrects the physical controlled variables so that the controlled variable for acceleration/deceleration or the controlled variable for steered angle will be at the upper limit (or the lower limit) of the specifiable range. Then, at step S134, the corrected physical controlled variables are confirmed.

Returning to FIG. 5, description is continued. Next, at step S14, the automated-driving ECU 201 divides each of the generated physical controlled variables into multiple time steps. A time step may be 100 milliseconds, for example, though not limited thereto.

Next, at step S15, the automated-driving ECU 201 issues the first control command based on a change in each physical controlled variable from a current time step to the next time step. For example, when one time step is 100 milliseconds and +2.0 km/h/s is specified as the acceleration/deceleration, a command specifying a speed change of 0.2 km/h per time step is generated. If a change of the steered angle to 20 degrees over two seconds is specified, for example, a command specifying a change in the steered angle of 0.1 degrees per time step is generated. The generated first control command is input to the control unit 301 of the vehicle control interface 300. The first control command may include data other than the foregoing ones as desired for the driving plan.

Figure 7:
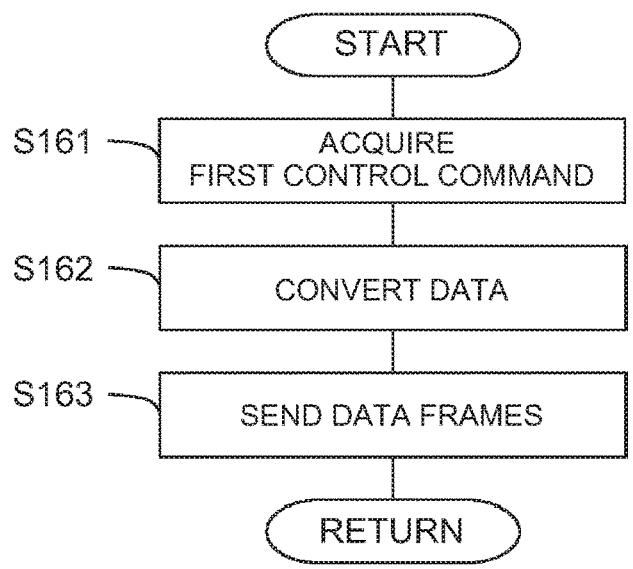
FIG. 7 is a flowchart of processing which is executed by the vehicle control interface in the first embodiment.

Next, at step S16, the vehicle control interface 300 (the control unit 301) processes the first control command acquired. FIG. 7 shows processing at step S16 in greater detail. First, at step S161, the control command processing unit 3011 acquires the first control command sent from the automated-driving ECU 201.

Next, at step S162, the control unit 301 performs data conversion. More specifically, the control command processing unit 3011 converts between the first control command and the second control command based on the conversion information 3021 stored in the storage unit 302.

Next, at step S163, the generated second control command is sent to the vehicle control ECU 101. In this step, the second control command generated at step S162 is encapsulated in data frames to be communicated on the in-vehicle network and is sent destined for the vehicle control ECU 101.

Returning to FIG. 5, description is continued. At step S17, the automated-driving ECU 201 senses the vehicle status after the sending of the second control command. In this step, sensor data sent from the vehicle control ECU 101 is converted by the vehicle control interface 300 based on conversion information and is relayed to the automated-driving ECU 201, which upon receiving it determines whether the vehicle is in a desired status or not.

Since the behavior of the vehicle is affected by the current load on the engine, the road conditions (e.g., a slope) and the like, the automated-driving ECU 201 in this embodiment determines whether desired physical controlled variables have been achieved or not by receiving the feedback of sensor data. The sensor data is acquired by the vehicle information processing unit 3012 from the vehicle platform 100 and converted to feedback data, which is then sent to the automated-driving ECU 201. The feedback data may include data other than the illustrated ones as long as they are predefined. For example, it may include data on factors that affect the behavior of the vehicle, such as the angular velocity of the tire turning angle or the steering angle, engine load, gradient (inclination) of a road, the number of occupants, loading quantity, data on road conditions, and data on traffic conditions.

Next, at step S18, the automated-driving ECU 201 modifies the driving plan based on the feedback data received. For example, if the feedback data indicates that the load on the engine is high and a requested acceleration cannot be met, the driving plan is modified such that a higher acceleration can be achieved. Although the present example shows a case of modifying the driving plan, physical controlled variables for achieving the driving plan may be modified without modifying the driving plan. In modifying physical controlled variables at this step as well, physical controlled variables are modified such that their specifiable ranges contained in the range information are not exceeded.

In the vehicle system according to the first embodiment, the vehicle control interface 300 notifies the automated-driving platform 200 of range information beforehand by performing the above-described processes, thus preventing transmission of non-achievable commands to the vehicle platform 100. Consequently, appropriate travel control of the vehicle can be performed.

Variants

The above-described embodiment is merely an example and the present disclosure may be practiced with appropriate modifications without departing from its scope. For example, the processing and means described in the present disclosure may be practiced in a desired combination unless it creates a technical inconsistency.

Also, processing that was described as being performed by a single device may be performed by multiple devices in a sharing manner. Alternatively, processing that was described as being performed by different devices may be performed by a single device. In a computer system, a hardware configuration (server configuration) with which functions are embodied may be varied flexibly.

The present disclosure may also be practiced by supplying a computer program implementing the functions described in the embodiment above to a computer and loading and executing the program by one or more processors included in the computer. Such a computer program may be provided to a computer via a non-transitory computer-readable storage medium connectable to a system bus of the computer or may be provided to the computer over a network. The non-transitory computer-readable storage medium includes any kind of media suitable for storing electronic instructions, such as any kind of disk like a magnetic disk (such as a floppy (registered trademark) disk, or hard disk drive (HDD)), an optical disc (such as a CD-ROM, DVD disc, or Blu-ray disc), or read-only memory (ROM), random access memory (RAM), EPROM, EEPROM, magnetic card, flash memory, and optical card.

What is claimed is:

1. A vehicle control interface, comprising:
    an interface computer configured to:
        connect between a vehicle platform including a first computer that performs travel control of a vehicle and an automated-driving platform including a second computer that performs automated-driving control of the vehicle;

acquire, from the second computer, a first control command containing an instruction for the vehicle platform, the instruction affecting a driving parameter of the vehicle;

convert the first control command to a second control command for the first computer;

send the second control command to the first computer; and send an operational range of the driving parameter to the second computer.

2. The vehicle control interface according to claim 1, wherein the interface computer is configured to acquire first information from the first computer and generate the operational range based on the first information.

3. The vehicle control interface according to claim 2, further comprising a first storage unit configured to store range generation information as a rule for generating the operational range from the first information, wherein the interface computer is configured to generate the operational range from the first information based on the range generation information.

4. The vehicle control interface according to claim 1, wherein the first control command is data not interpretable by the first computer, and the second control command is data interpretable by the first computer.

5. The vehicle control interface according to claim 1, further comprising a second storage unit configured to store conversion information as a rule for converting the first control command and the second control command, wherein the interface computer is configured to convert the first control command to the second control command based on the conversion information.

6. A vehicle system comprising:
a vehicle platform including a first computer configured to perform travel control of a vehicle; and
a vehicle control interface configured to connect between the vehicle platform and an automated-driving platform including a second computer that performs automated-driving control of the vehicle, the vehicle control interface comprising an interface computer configured to:
acquire, from the second computer, a first control command containing a plurality of instructions for the vehicle platform, the instruction affecting a driving parameter of the vehicle;
convert the first control command to a second control command for the first computer;
send the second control command to the first computer; and
send an operational range of the driving parameter to the second computer.

7. An automated-driving platform, comprising an interface computer configured to:
receive, from a vehicle control interface, an operational range of a driving parameter, and
generate a first control command containing an instruction for a vehicle platform such that the driving parameter falls within the operational range,
wherein the vehicle control interface is configured to:
connect between the vehicle platform including a first computer that performs travel control of a vehicle and an automated-driving platform including a second computer that performs automated-driving control of the vehicle;
acquire the first control command from the second computer;
convert the first control command to a second control command for the first computer; and
send the second control command to the first computer.

\* \* \* \* \*